United States Patent [19]

Ross

[11] Patent Number: 5,394,402
[45] Date of Patent: Feb. 28, 1995

[54] HUB FOR SEGMENTED VIRTUAL LOCAL AREA NETWORK WITH SHARED MEDIA ACCESS

[75] Inventor: Floyd E. Ross, Warrington, Pa.

[73] Assignee: Ascom Timeplex Trading AG, Bern, Switzerland

[21] Appl. No.: 258,524

[22] Filed: Jun. 10, 1994

Related U.S. Application Data

[63] Continuation of Ser. No. 79,099, Jun. 17, 1993, abandoned.

[51] Int. Cl.$^6$ ............................................... H04J 3/26
[52] U.S. Cl. ..................... 370/94.1; 370/94.3; 370/85.13
[58] Field of Search ............. 370/85.13, 94.3, 85.9, 370/85.1, 60, 94.1, 60.1, 85.14; 340/825.52

[56] References Cited

U.S. PATENT DOCUMENTS

| | | | |
|---|---|---|---|
| 4,823,338 | 4/1989 | Chan et al. | 370/85.1 |
| 4,933,937 | 6/1990 | Konishi | 370/85.13 |
| 5,140,585 | 8/1992 | Tomikawa | 370/60.1 |

OTHER PUBLICATIONS

Stallings, "Data and Computer Communications", 1988, p. 440.

*Primary Examiner*—Douglas W. Olms
*Assistant Examiner*—Huy D. Vu
*Attorney, Agent, or Firm*—Irwin Ostroff; Robert B. Ardis

[57] ABSTRACT

A hub for a segmented virtual local area network with shared media access has at least one internal port for receiving and transmitting digital data messages within the hub and may have at least one external port for receiving and transmitting digital data messages external to the hub. The hub further includes a memory for storing virtual local area network (VLAN) designations for internal and external ports. The hub associates VLAN designations with at least one internal port, stores such VLAN designations in the memory, and associates the stored VLAN designations with messages transmitted from any of the ports to which the VLAN designation has been assigned. Additionally, the hub identifies VLAN designations associated with messages received by or within the hub and means and transmits to any of the internal ports only messages received within the hub and having associated with them a VLAN designation which matches the stored VLAN designation assigned to the port. The hub also has the ability to store media access control (MAC) addresses of internal ports and of end stations connected to internal or external ports and only send a message to a port when the destination address of the message is the MAC address of that port or of an end station known to be reachable through that port.

17 Claims, 4 Drawing Sheets

HUB FOR SEGMENTED VIRTUAL LOCAL AREA NETWORK WITH SHARED MEDIA ACCESS

CROSS REFERENCE TO RELATED APPLICATION

This application is a continuation of U.S. patent application Ser. No. 08/079,099, filed Jun. 17, 1993 now abandoned.

FIELD OF THE INVENTION

This invention relates generally to local area networks for digital data communication and, more particularly, to network hubs for local area networks with enhanced privacy and optimized use of network bandwidth.

BACKGROUND OF THE INVENTION

A local area network (LAN) for digital data communications typically includes a plurality of network hubs interconnected by a suitable backbone transmission network. Individual hubs in a LAN may include one or more internal ports to which end stations may be connected and one or more external ports for transmitting messages from the hub to the backbone transmission network and for receiving messages for the hub from the backbone transmission network. In such a LAN, messages originating at an internal port of one hub, or at an end station connected to an internal port of such a hub, are commonly transmitted to every other hub and end station in the LAN, although typically they are addressed to only a single end station within the LAN. Message security depends upon limiting access by individual hubs and end stations to only those messages specifically addressed to them. Because all messages share the same transmission media (including the backbone network), both the number and the size of the messages carried by the LAN at any one time are limited by the available transmission bandwidth. If enhanced security and more efficient use of the available bandwidth are desired, it is generally necessary to rewire the LAN physically so that it includes only the smaller sub-set of hubs or end stations needed.

In the past, separately wired LANs have often been interconnected by so-called bridging or routing functions allowing the transfer of messages from a port or end station of a hub in one LAN to a port or end station of a hub in another LAN. Bridges, as a minimum, examine the addresses contained by a message to accomplish the desired transfers, whereas routers provide more functionality, commonly supplying such capabilities as protocol conversions and store and forward operation. Bridging and routing functions not only tend to be complex to implement but also can potentially detract from both message security and most efficient use of transmission bandwidth.

A previous approach to enhancing message security and improving bandwidth efficiency in the context of interconnected data terminals avoided the shared transmission media of a hard wired LAN entirely and depended, instead, upon use of a switched telecommunications network as the sole interconnection medium. Such an approach is illustrated in U.S. Pat. No. 4,823,338, which issued Apr. 18, 1989, to Kenneth K. Chan et al.

In the arrangement disclosed by the Chan et al. patent, a plurality of data terminals are interconnected by a switched telecommunications network and a central processor is used as a server to control all switched actions. More specifically, each data terminal requires a separate connection, known as an "umbilical connection", to the server and the server is connected to control the appropriate telecommunications network switch or switches.

The server in the arrangement disclosed in the Chan et al. patent also keeps track of both an address and a "LAN" designation of each data terminal and permits calls to be established through the switched network only to those data terminals which not only share a "LAN" designation with the originating data terminal but also have the destination addresses for which the messages are intended. For any given message, no switching connection is established to data terminals other than those to which the message is addressed and also bear the "LAN" designation of the originating terminal, thereby providing a relatively high degree of message security. Also, because the message needed to traverse only that portion of the telecommunications network extending from the originating terminal to the terminating terminal, message bandwidth is constrained only by transmission bandwidth made available by the portion of the network actually used. The resulting arrangement is called a "virtual LAN" because there are no fixed interconnections between its member terminals. Instead, interconnections can be established or disestablished simply by messages sent to the central server to identify members of the "virtual LAN".

Because the approach disclosed in the Chan et al. patent avoids use of shared transmission media and depends upon use of a switched telecommunications network as the sole interconnection between terminals, it is inapplicable to and will not work in the context of a conventional LAN. Moreover, the central processor used as a server not only imposes substantial overhead costs upon the system but also is vulnerable to failure in the sense that, when it fails, the whole "virtual LAN" fails. An important need for enhancing message security and improving bandwidth efficiency in more conventional LANs, dependent upon shared transmission media which may be hard wired, switched, or both, thus still remains.

SUMMARY OF THE INVENTION

The present invention is a digital data communications network hub which makes possible establishment of a segmented virtual local area network (VLAN) within a larger LAN, relying upon shared transmission media to form a backbone network. Such a VLAN affords enhanced message security and more efficient use of backbone network transmission bandwidth. It does so, moreover, relatively simply and inexpensively and in a manner immune to centralized system failure.

Instead of being dependent upon a switched telecommunications network and upon a centralized processor-server, the present invention is hub oriented and software controlled in the sense that it readily permits one or more hubs in a shared transmission media access LAN to be associated with one another on demand to form one or more segmented VLANs within a larger LAN. Each VLAN so provided is made up only of those segments of the larger LAN that are specific unto itself. Bridging and routing functions are no longer needed to transfer a message from one LAN to another because VLANs may be configured or reconfigured at will within a single LAN or within a network comprising multiple LANs connected by backbone networks.

The present invention has the advantage of still retaining the conventional LAN activities, working environment, and access for a LAN workgroup consisting of a number of end stations that are all located on the same internal port of a hub while at the same time providing the enhanced functionality of the VLAN concept in the larger context of the total network.

From one aspect of the invention, a digital data communications network hub for use in a shared transmission media access LAN includes at least one internal port for receiving and transmitting messages within the hub. The hub may also include at least one external port for receiving and transmitting messages external to the hub. The hub further includes a memory for storing VLAN designations for at least some of the internal and external ports, means for assigning a VLAN designation to at least one of the internal ports and storing the assigned VLAN designation in the memory, and means for associating the stored VLAN designation with messages transmitted from any of the internal ports to which the stored VLAN designation has been assigned. Associating, in this sense, is intended to encompass adding the stored VLAN designation to messages originating at an internal port within the hub and transmitted out of the hub by way of an external port.

Additionally, from another aspect of the invention, the hub includes both means for identifying VLAN designations associated with messages directed to any of the internal ports and means for transmitting to any of the internal ports only messages received within the hub having an associated VLAN designation which matches the stored VLAN designation assigned to the port. Different internal ports may, if necessary, be assigned different VLAN designations simultaneously and any one of the internal ports may be assigned more than one VLAN designation. Both added security and enhanced bandwidth efficiency are obtained because a message is not transmitted to internal ports unless such ports bear the VLAN designation associated with the message. In other words, each message traverses only the segment or segments of a shared transmission medium which take it to internal ports which are part of the same VLAN as the port which originated the message and neither traverses nor needs to traverse any other segments. All functions may readily be software implemented in the interest of simplifying VLAN configuration and reconfiguration.

From another aspect of the invention, the hub may include means for transmitting outside the hub through an external port only messages from internal ports having associated with them a VLAN designation matching a VLAN designation associated with that external port.

From still another aspect of the invention, the digital data communication network hub's memory may also store addresses for end stations connected to any of the hub's internal ports and at least selected addresses for end stations connected to the hub through any of its external ports. A hub so equipped may include means for determining the address of each end station connected to any of its internal ports and storing the end station addresses in the memory. Likewise, means may be provided to ascertain the addresses of end stations that may be reached through specific external ports and storing those addresses in the memory as well.

A hub, from another aspect of the invention, may also include means for identifying destination addresses carried by messages received within the hub and means for transmitting to any of the internal ports only received messages which both have a VLAN designation which matches a stored VLAN designation assigned to that particular port and carry a destination address which matches the stored address of an end station connected to the same port. Message security and shared transmission media bandwidth efficiency are thus further enhanced. Once again, functions are preferably software implemented in order to simplify VLAN configuration and reconfiguration.

From another aspect of the invention, the hub may include means for transmitting outside the hub from an external port messages having associated with them the assigned VLAN designation and originating from any of the internal ports only when the destination addresses of such transmitted messages do not match an address stored in memory of an internal port within the hub.

From yet another aspect of the invention, the hub includes means for transmitting outside the hub from an external port messages having associated with them the assigned VLAN designation and originating from any of the internal ports only when such messages do not carry destination addresses matching either the stored address of an internal port within the hub or the stored address of an end station connected to an internal port within the hub or when such messages can be reached from another external port.

From still another aspect of the invention, the hub includes means for transmitting outside the hub from an external port only messages carrying destination addresses which match addresses stored in its memory for end stations connected to the hub through such an external port or messages from internal ports whose VLAN designations match that of the external port.

The invention may be more fully understood from the following detailed description of a specific embodiment, taken in the light of the accompanying drawing and the appended claims.

DETAILED DESCRIPTION

Figure 1:
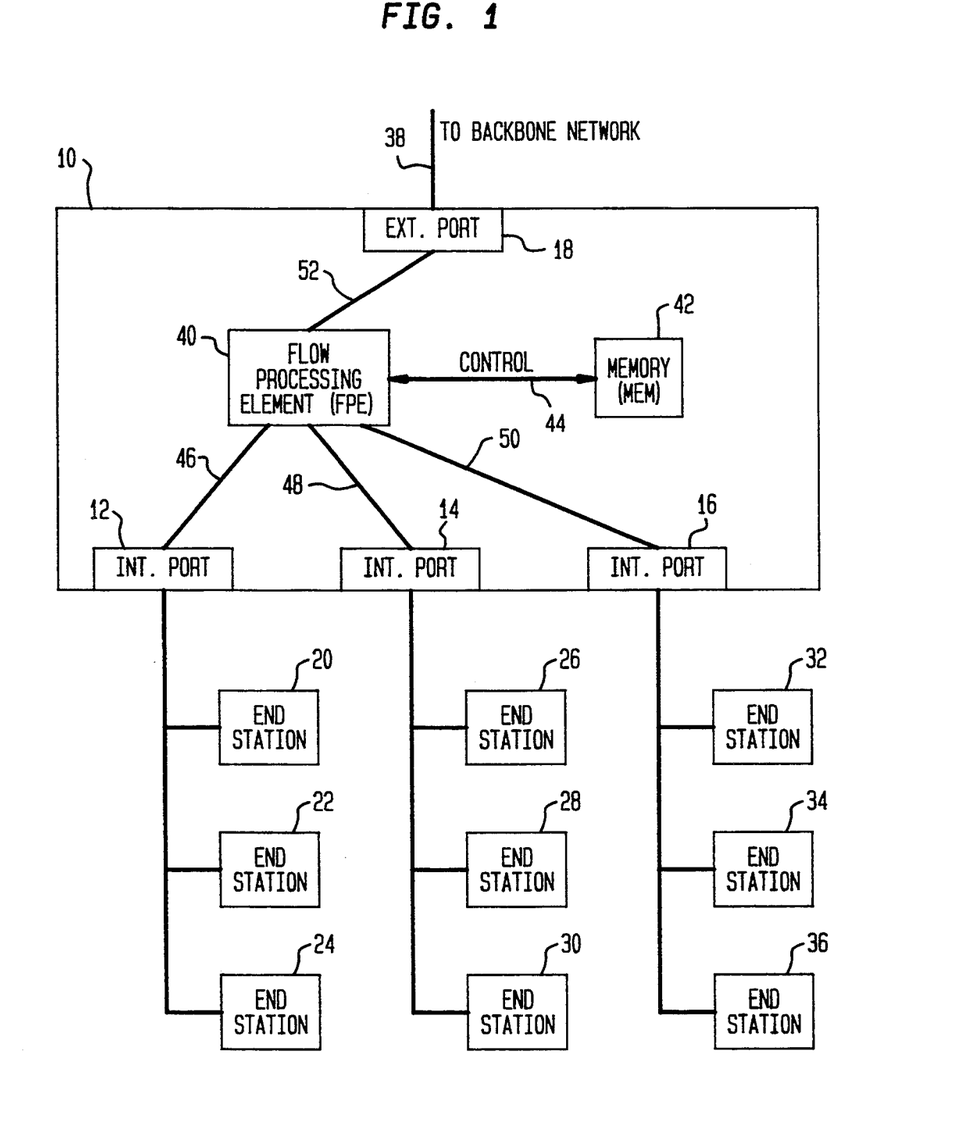
FIG. 1 is a block diagram of a digital data communications hub in accordance with the invention having multiple end stations connected to each internal port.

FIG. 1 shows a digital data communications network hub 10 in accordance with the invention having three internal ports 12, 14, and 16 and one external port 18. Although FIG. 1 shows this specific number of ports by way of illustration, such a hub may have one or more internal ports and zero, one, or more external ports.

By way of illustration, each of internal ports 12, 14, and 16 of hub 10 is shown with three end stations connected to it. End stations 20, 22, and 24 are connected to internal port 12, end stations 26, 28, and 30 are connected to internal port 14, and end stations 32, 34, and 36 are connected to internal port 16. In practice, hub 10 may have zero, one, or more end stations on each of its internal ports, depending upon specific communication needs. Specific protocols used for the internal port to end station couplings are not specified because different internal ports on the same hub may use different technologies and protocols to make appropriate end station connections.

Network hub 10 further includes a flow processing element (FPE) 40 and a local memory 42 for storing VLAN designations for internal ports 12, 14, and 16, media access control (MAC) addresses for end stations 20, 22, 24, 26, 28, 30, 32, 34, and 36, MAC addresses, when desired, for end stations associated with other network hubs connected to hub 10 only through external port 18, and VLAN designations, when desired, for external port 18 when such VLAN designations apply to ports and end stations reachable through external port 18. In addition, hub 10 includes a control path 44 between FPE 40 and memory 42, a message path 46 between FPE 40 and internal port 12, a message path 48 between FPE 40 and internal port 14, a message path 50 between FPE 40 and internal port 16, and a message path 52 between FPE 40 and external port 18. FPE 40 preferably takes the form of a software controlled central processing unit (CPU), although hard wired logic circuitry may, of course, be used instead if the reconfiguration flexibility afforded by software is not desired or needed.

It should be noted that MAC addresses are unique designations assigned during the manufacture of MAC semiconductor chips for subsequent identification purposes. By industry convention, no two MAC chips are ever assigned the same MAC address designation, even if made by different manufacturers. In hub 10, each of end stations 20, 22, 24, 26, 28, 30, 32, 34, and 36 is provided with a different MAC chip and thus receives its own distinctive and unique MAC address. End stations may, if desired, be provided with more than one MAC chip and, hence, more than one MAC address, but single addresses tend to be the norm. In addition, internal ports 12, 14, and 16 may be provided with MAC chips and thus individual MAC addresses of their own.

Figure 2:
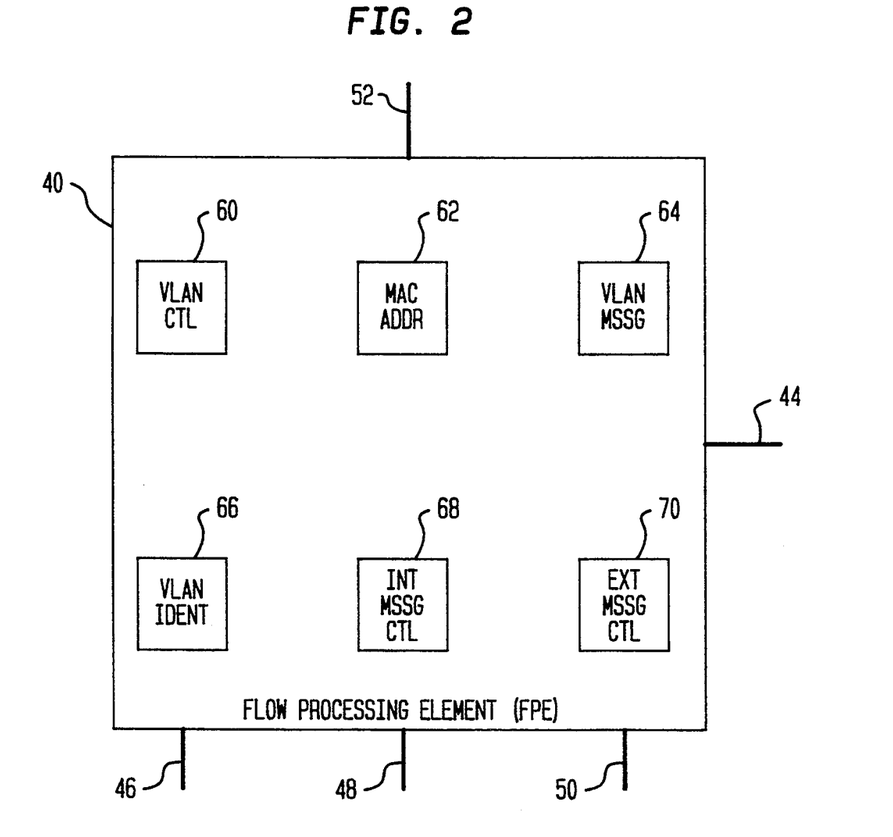
FIG. 2 is a block diagram of a flow processing element suitable for use in the hub illustrated in FIG. 1.

FIG. 2 is a symbolic block diagram of an illustrative example of FPE 40 in network hub 10, showing a control path 44 to memory 42, a message path 46 to internal port 12, a message path 48 to internal port 14, message path 50 to internal port 16, and a message path 52 to external port 52 (ports 12, 14, 16, and 18 are all shown in FIG. 1). Included within FPE 40 are a number of specific functions which may be either hardware or software implemented. One function takes the form of control means (VLAN CTL) 60 for associating VLAN designations with any or all of internal ports 12, 14, and 16 and external port 18 and storing the assigned VLAN designations in memory 42. Another function takes the form of means (MAC ADDR) 62 for determining the MAC addresses of each of end stations 20, 22, 24, 26, 28, 30, 32, 34, and 36 (and the MAC addresses of each of internal ports 12, 14, and 16 if such MAC addresses exist) and storing those MAC addresses in memory 42. Means 62 may also include the ability to store in memory 42 MAC addresses of any of internal ports 12, 14, and 16 and MAC addresses of internal ports and/or end stations associated with other network hubs and connected to hub 10 only through external port 18. Because means 62 lacks direct access to the latter remote internal ports and/or end stations and hence lacks the ability to determine their MAC addresses by itself, their identity may be supplied to FPE 40 by a human operator, by local software, by a remotely located control program, or by any combination of the three.

Another function within FPE 40 takes the form of means (VLAN MSSG) 64 for associating a stored VLAN designation with each message transmitted from any of internal ports 12, 14, and 16 to which that stored VLAN designation has been assigned. Such association also connotes adding stored VLAN designations to messages originating within hub 10 and transmitted outside of hub 10 by way of external port 18. Still another function takes the form of means (VLAN IDENT) 66 for identifying VLAN designations associated with messages received by FPE 40 within hub 10 from any of internal ports 12, 14, or 16 or from external port 18 or carried by messages received within hub 10 from external port 18.

Still another function within FPE 40 takes the form of means (INT MSSG CTL) 68 for transmitting from FPE 40 to any of internal ports 12, 14, or 16 only received messages (whether from external port 18 or from another of internal ports 12, 14, and 16) which have an associated VLAN designation which matches the stored VLAN designation assigned to the port and carry a destination address which matches the stored MAC address of an end station connected to that same port or the stored MAC address of that same port itself.

Yet another function takes the form of means (EXT MSSG CTL) 70 for transmitting outside of hub 10 via external port 18 transmitted messages from any of internal ports 12, 14, and 16 associated with the assigned VLAN designation only when such transmitted messages are not addressed to either an internal port within hub 10 or an end station connected to an internal port within hub 10. Means 70 may, in addition, transmit outside of hub 10 via external port 18 only messages addressed to an end station or port outside of hub 10 when the MAC address of such end station or port is stored in memory 42.

Pseudo code sufficient for specifically implementing functions 60, 62, 64, 66, 68, and 70 within FPE 40 in software is attached hereto as Appendix A.

Figure 3:
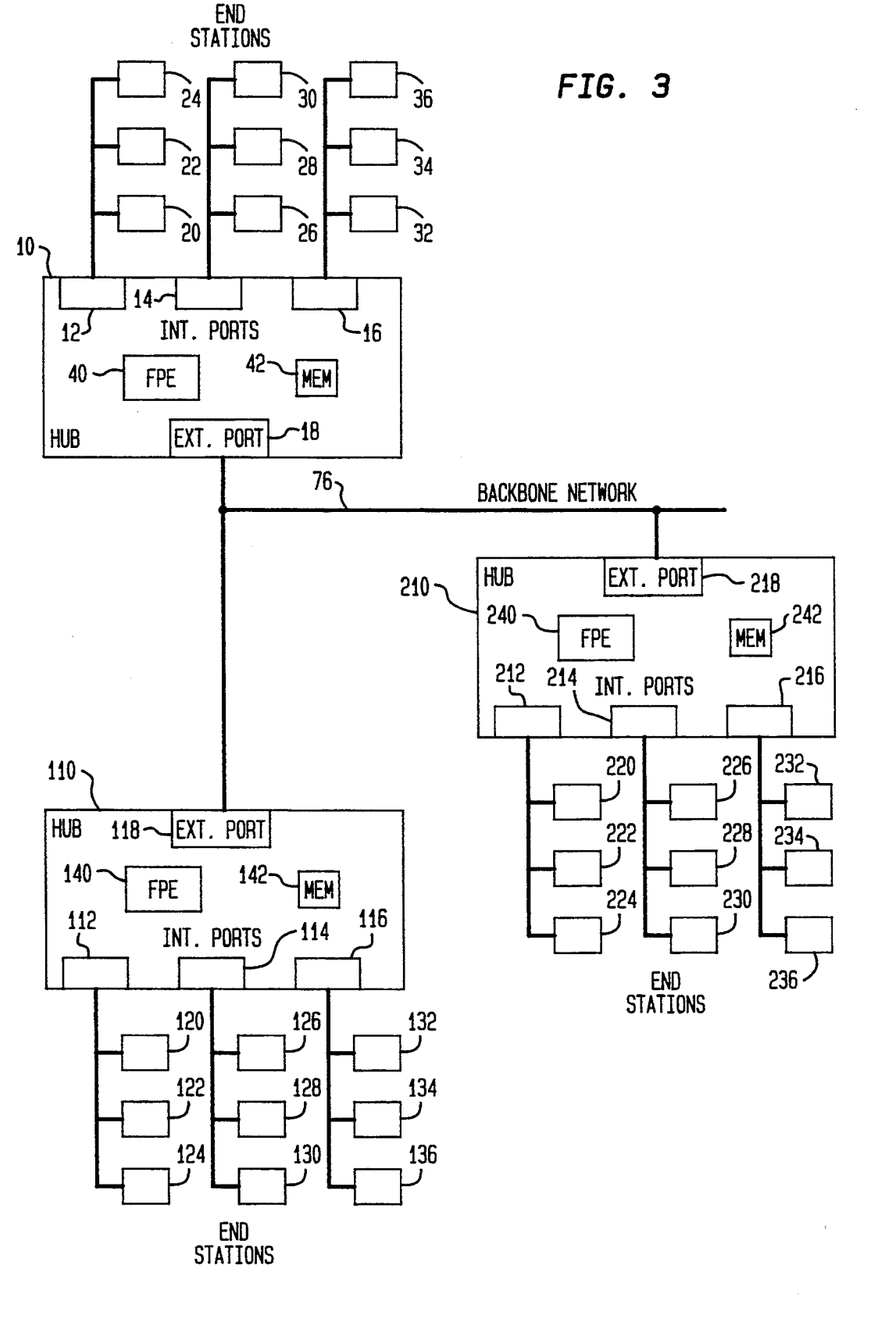
FIG. 3 is a block diagram showing several digital data communications hubs in accordance with the invention interconnected by a backbone transmission network.

FIG. 3 shows how a number of similar network hubs in accordance with the invention may be connected by a backbone network 76 to form a physically larger network than could be formed with a single hub. Backbone network 76 is a shared transmission medium and may include direct wire or optical fiber connections, radio connections, switched network connections, or any combination of different types of connections. The important point is that at least selected portions of backbone network 76 are shared by all messages transmitted contemporaneously from any of external ports 18, 118, and 218.

Three hubs 10, 110, and 210 are shown in FIG. 3. Hub 10 is identical to hub 10 in FIG. 1 and all components and connected end stations bear the same reference numerals as in FIG. 1. Hubs 110 and 210 are also identical to hub 10 and all components and connected end stations bear similar reference numerals in sequences beginning with 110 and 210, respectively. Specifically, hub 110 comprises internal ports 112, 114, and 116, an external port 118, a FPE 140, and a memory 142, while hub 210 comprises internal ports 212, 214, and 216, an external port 218, a FPE 240, and a memory 242.

End stations connected to internal ports 112, 114, and 116 of hub 110 are generally similar to those connected to corresponding internal ports of hub 10. Connected to internal port 114 of hub 110 are end stations 126, 128, and 130. Connected to internal port 116 of hub 110 are end stations 132, 134, and 136.

Hub 210 is similar and comprises internal ports 212, 214, and 216, an external port 218, a FPE 240, and a memory 242. Connected to internal port 212 of hub 210 are end stations 220, 222, and 224. Connected to internal port 214 of hub 210 are end stations 226, 228, and 230. Connected to internal port 216 of hub 210 are end stations 232, 234, and 236. Specific protocols used for backbone network 76 are not specified herein because different backbone links in the same network may in practice use different technologies and different protocols.

Figure 4:
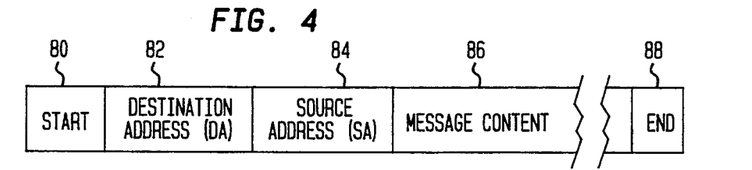
FIG. 4 illustrates the format of a typical digital data message carried by a LAN.

FIG. 4 illustrates the general sequential format of a typical LAN message, which includes a start field 80, a destination address (DA) field 82, a source address (SA) field 84, a message content field 86, and an end field 88. Each end station associated with network hub 10, for example, has a unique address determined by its own MAC address chip. When an end station originates a data message, its MAC address is inserted in the SA field 84 of outgoing messages. Similarly, the MAC address of an end station for which the message is intended is inserted in the DA field 82 of that same message. The MAC address in DA field 82 is used to match the MAC address of end stations in receiving hubs and end stations to determine the end station for which the message is intended. Such internal ports as internal ports 12, 14, and 16 may themselves also have MAC addresses (e.g., for administrative purposes independent of any connected end stations). Each of such unique internal port MAC addresses would be inserted in the DA and SA fields 82 and 84 instead of end station addresses, where applicable.

The message format illustrated in FIG. 4 shows a digital data message created by, or intended for, any one of the end stations in FIG. 3.

Figure 5:
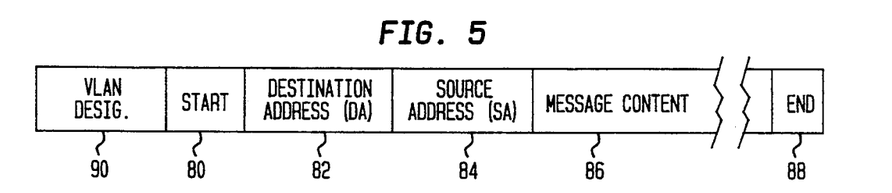
FIG. 5 illustrates the format of a digital data message with a VLAN designation appended.

FIG. 5 shows the same message as FIG. 4 with a VLAN designation field 90 appended preparatory to encapsulating the message for transmission out of a hub through an external port over backbone network 90.

Figure 6:
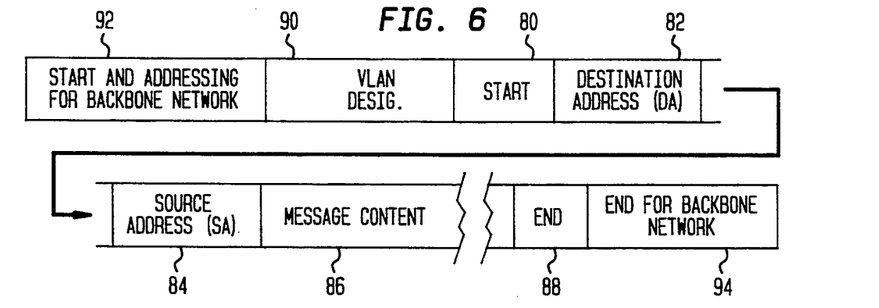
FIG. 6 illustrates the format of a digital data message with a VLAN designation appended, encapsulated for transmission over a packet backbone network.
Figure 7:
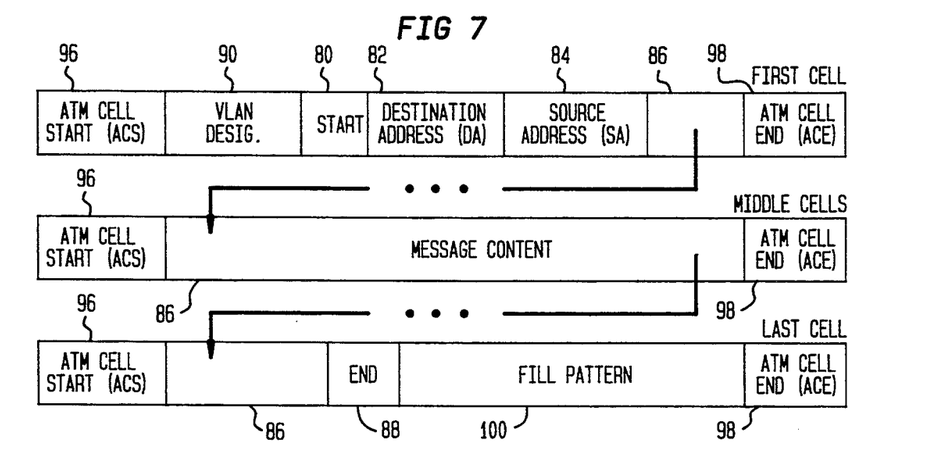
FIG. 7 illustrates the format of a digital data message with a VLAN designation appended, encapsulated for transmission over an asynchronous transfer method (ATM) backbone network.

FIGS. 6 and 7 show two different encapsulations of a message like that shown in FIG. 5 for transmission on backbone network 76, the first (FIG. 6) being for a packet backbone network and the second (FIG. 7) being for an Asynchronous Transfer Method (ATM) backbone network. In FIG. 6, the packet encapsulation includes an initial start and addressing field 92 for the backbone network and a final end field 94 for the backbone network. In FIG. 7, the ATM network encapsulation includes a plurality of fixed-length cells (only a single middle cell is shown between the first cell and the last) each having an initial ATM cell start (ACS) field 96 and a final ATM cell end (ACE) field 98. In FIG. 7, the message content field 86 extends through all cells and a final fill pattern field 100 is used to provide any necessary padding in the last cell between end field 88 and ACE cell 98. In FIG. 7, there may be any number of middle cells.

An important objective of the VLAN mechanism provided by the present invention is to allow all parts of the network, i.e., end stations and/or internal ports of hubs, having the same VLAN designation to interchange messages solely with one another. Message exchanges between parts of the network having different VLAN designations are specifically prevented. This arrangement, in effect, allows those stations having the same VLAN designation to function as if they were part of the same LAN (i.e., as members of a virtual LAN or VLAN) separate from all other stations having different VLAN designations (i.e., belonging to different virtual LANs or VLANs). This is accomplished by associating a VLAN designation with each message, based upon the source of the message. A message may then only be delivered (1) to an end station that is connected to an internal port having a matching VLAN designation, (2) to an internal port that has a matching VLAN designation, or (3) to an external port connected to a hub having a port with a matching VLAN designation. The service thus provided is fully comparable to the services provided by a conventional LAN.

In its simplest form, the VLAN mechanism afforded by the present invention assigns a VLAN designation to any of the internal ports of a hub (i.e., any of internal ports 12, 14, and 16 of network hub 10 in FIG. 3, internal ports 112, 114, and 116 of network hub 110, and internal ports 212, 214, and 216 of hub 210). There is no requirement that the VLAN designations assigned to different internal ports be different. In general, the VLAN mechanism depends on the fact that a multiplicity of internal ports, not necessarily on the same hub, have the same VLAN designation.

The VLAN designation for each internal port is stored in the memory (MEM) portion of the hub (i.e., MEM 42 for hub 10, MEM 142 for hub 110, and MEM 242 for hub 220). Every time a message is received by a hub on an internal port, the VLAN designation of that port is then associated with the message. Association is accomplished by the flow processing element (FPE) 40, 140, or 214, which looks up the VLAN designation in the respective one of MEMs 42, 142, or 242, based on the number of the internal port where the message originated. This type of MEM operation can easily be performed by a content addressable memory (CAM), although other memory mechanisms may be used instead. The MEM may also be used to identify the internal ports that have a VLAN designation which matches the VLAN designation associated with a message.

When a message received from an internal port is to be transmitted from the same hub's external port, the appropriate VLAN designation is appended (see FIG. 5) by the flow processing element (FPE), based on the internal port from which the message was received. The message is then encapsulated (see FIGS. 6 and 7) for transmission onto the backbone network 76 by the external port. A basic system in accordance with the invention also forwards the message to all other internal ports of the same hub that have a VLAN designation matching the VLAN designation of the internal port from which the message originated.

When an encapsulated message is received at the external port of a hub (10, 110, or 210), the FPE (40, 140, or 240) de-encapsulates it to recover the VLAN designation and the original message. A basic system in accordance with the invention then forwards the message to each of its internal ports that has a matching VLAN designation.

To describe the message exchanges allowed, consider the following example, in which VLAN designations (not shown in the drawing) are underlined to distinguish them from reference numerals. In FIG. 3, the VLAN designations associated with hub 10, internal ports 12, 14, and 16 may be 51, 61, and 71, respectively. The VLAN designations associated with hub 110, internal ports 112, 114, and 116 may be 61, 71, and 81, respectively. The VLAN designations associated with hub 210, internal ports 212, 214, and 216 may be 71, 81, and 81, respectively. In this example, no other internal ports have matching VLAN designations. This arrangement allows messages to be exchanged among the end stations connected to internal port 14 of hub 10 and internal port 112 of hub 110. It also allows messages to be exchanged among the end stations connected to internal port 16 of hub 10, internal port 114 of hub 110, and internal port 212 of hub 210. Similarly, it allows messages to be exchanged between the end stations attached to internal port 116 of hub 110, internal port 214 of hub 210, and internal port 216 of hub 210. If some other hub has an internal port with a VLAN designation of 51, end stations attached to it will be able to exchange messages with those attached to internal port 12 of hub 10. No other message exchanges are allowed to take place.

The FPE 40 in combination with the MEM 42 may, in accordance with various aspects of the invention, also be used to provide a number of useful functions to enhance the operation of the VLAN mechanism. Also stored in MEM 42, and associated with each of the internal ports may be the unique MAC addresses of all of the end stations that are attached to each particular internal port. These are stored so that when the FPE 40 accesses MEM 42 using the unique MAC address, MEM 42 returns the number of the internal port and the VLAN designation associated with it.

A further expansion of the capability of MEM 42 may, in accordance with other aspects of the invention, provide similar information for unique MAC addresses that belong to end stations attached to the internal ports of other hubs reachable through external port 18. This allows FPE 40 to choose between alternative external ports, or among paths that are provided by any individual external port.

In operation, when a message is received from an internal port, the FPE 40 accesses the MEM 42 in order to associate a VLAN designation with the message based on the internal port from whence it came, and in addition, by using the unique MAC address in the DA field 82 of the message, learns if the end station with the unique address matching that DA is located on one of the internal ports of the hub, and if so, which internal port and the VLAN designation of that internal port. Possible results include the following:

1. The end station with that DA is located on the internal port from whence the message originated. In this instance, no further action need be taken by the FPE as the message should already have been received by the proper end station.

2. The end station with that DA is located on one of the other internal ports on the same hub and the VLAN designation associated with the message by the FPE matches that of the internal port on which that end station is located. In this instance, the FPE forwards the message to the appropriate internal port. It is not necessary to append the VLAN designation to the message as internal association with the hub is sufficient. If the VLAN designation associated with the message does not match that of the internal port on which the end station with the DA is located, then the FPE discards the message.

3. The end station with that DA is not located on one of the other internal ports on the same hub. In this instance, the message with the VLAN designation appended is encapsulated in the appropriate format by the FPE 40 and forwarded to the external port for transmission on the backbone network.

In the event (not shown) that there is more than one external port in a network hub, the appropriately encapsulated message may be forwarded to all of such external ports for transmission on multiple backbone networks, or in still more sophisticated systems, the FPE (40, 140, or 240) in conjunction with the MEM (42, 142, or 242) may be used to establish on which of the available backbone networks the encapsulated message should be forwarded, based on either the VLAN designation associated with the message, the value of the DA field contained in the message, or both.

When an encapsulated message is received from the backbone by the hub at its external port, the encapsulated message is de-encapsulated to obtain the VLAN designation and the original message content. The FPE (40, 140, or 240) then accesses the MEM (42, 142, or 242) to determine the appropriate action based on the VLAN designation and the unique address in the DA field 82 of the message. If the end station with that DA is found to be on one of the internal ports of the hub and the VLAN designation associated with the message matches that of the internal port on which that end station is located, then the FPE (40, 140, or 240) forwards the message to that internal port. Otherwise, the FPE (40, 140, or 240) discards the message.

Note that the procedures describe above may be used to ensure that a message is only forwarded to the specific segment of the network where the end station with the unique address matching the DA is located. This offers a number of features, including the following:

1. The bandwidth capacity of a particular backbone network segment or of a particular internal port is only used for the transmission of messages that are indeed intended for an end station that can be reached by that backbone network segment or internal port.

2. A security feature is provided in that messages are never transmitted over a backbone network segment when the end station to which it is addressed is local to the hub, never forwarded to an internal port that does not have a VLAN designation that matches the VLAN designation that is associated with the message, and never forwarded to an internal port that does not have the end station with the unique address that matches the DA.

The former feature avoids wasting the available bandwidth, while the latter enhances the value of the VLAN principle by adding security equivalent to that offered by a conventional LAN.

A number of enhancements of the VLAN mechanism may be used to provide additional capabilities. One enhancement may also associate a VLAN designation, or series of VLAN designations, with an external port. A message originating from one of the end stations on one of the internal ports is only forwarded to an external port for transmission over the backbone network by the FPE 40 when the VLAN designation associated with the message matched a VLAN designation associated with the external port. This feature of the VLAN may be used to limit and control traffic on the backbone transmission network.

Another enhancement is provided by allowing an internal port to have multiple VLAN designations assigned to it. Thus, a message originating from one of the end stations attached to that internal port may have more that one VLAN designation associated with it by the FPE. In this instance, all of the operations described elsewhere herein are the same as they have already been described except that the VLAN designation associated with the message is interpreted as a series of VLAN designations and a match is achieved when any one of the VLAN designations match. With this enhancement, the VLAN designation as shown appended to the message for transmission on the backbone network (see FIG. 5) is actually a series of VLAN designations. In simple operation, the message is forwarded to all internal ports that have a VLAN designation that matches one of the VLAN designations associated with the message. In enhanced operation, the message is forwarded to the specific internal port that has the end station with the unique address that matches the DA of the message when one of that internal port's VLAN designations matches one of the VLAN designations associated with the message.

Examples of the message exchanges allowed using the preceding enhancement include the following: In FIG. 3, the VLAN designations associated with internal port 12 of hub 10 may be 51, 61 and 71, the VLAN designations associated with internal port 112 of hub 110 may be 61 and 81, while the VLAN designations associated with internal port 212 of hub 210 may be 71 and 81. End stations connected to these three internal ports, internal port 12 of hub 10, internal port 112 of hub 110, and internal port 212 of hub 210, are all able to exchange messages with one another. If some other internal port has a VLAN designation of 51, end stations connected to it may exchange messages with those connected to internal port 12 of hub 10. If some other internal port has a VLAN designation of 61, end stations connected to it may exchange messages with those connected to internal port 12 of hub 10 and internal port 112 of hub 110. If some other internal port has a VLAN designation of 71, end stations connected to it may exchange messages with those connected to internal port 112 of hub 110 and internal port 212 of hub 210.

If some other internal port has a VLAN designation of 81, end stations connected to it may exchange messages with those connected to internal port 112 of hub 110 and internal port 212 of hub 210. Finally, if some other internal port has only a VLAN designation of 91, end stations connected to it will not be able to exchange messages with those connected to any of internal ports 12, 112, or 212.

Another enhancement is provided by allowing each of the ports themselves to have a separate VLAN designation that is different from the VLAN designation that becomes associated with messages that originate from the end stations connected to the internal port. This enhancement requires that an internal port signal the FPE (40, 140, or 240) along with each message to differentiate between messages that originate in the internal port and messages that originate in one of the connected end stations. This enhancement does not have any effect on exchanges of messages between end stations connected to these internal ports. Instead, it provides a VLAN designation that may be uniquely associated with all management information either directed at the ports or exchanged between internal ports. This VLAN designation may have special rules of use and may be associated with messages from end stations that have a special management status.

It is to be understood that the embodiments of the invention which have been described are illustrative. Numerous other arrangements and modifications may be readily be devised by those skilled in the art without departing from the spirit and scope of the invention.

APPENDIX A

PSEUDO CODE FOR PROGRAMMING FLOW PROCESSING

ELEMENTS 10, 110, AND 210

Definitions

The following definitions are used throughout this appendix:

EP An external port, which may be part of a Hub, that supplies connections to other Hubs located either locally or remotely.

EP(i) Designates a specific one of the external ports of a Hub, external Port i, where i is any integer of 1 or greater.

FPE The Flow Processing Element within each Hub that controls its operation.

IP An internal port, which is part of a Hub, that in turn supplies connections for a number of end stations that are considered as local to the Hub but may physically be located either locally or remotely.

IP(j) Designates a specific one of the internal ports of a Hub, Internal Port j, where j is any integer of 1 or greater.

MATCH A MATCH indicates that one of the VLAN designation(n) s associated with a Message matches one of the VLAN designation(n)s associated with the intended destination.

MAC The Media Access Control (MAC) is the logical connection element in each connected end station. A MAC is also required in each IP so that the IP and end station may interchange Messages.

MAC(m) Designates a specific MAC, where m is any integer. Values of m are assigned on a global basis such that no two MACs shall have the same value of m.

MEM A content addressable memory organized in such manner that signaling an argument returns the associated values.

VLAN designation(n) Designates a specific Virtual LAN number, where n is an integer of any value. A given VLAN designation(n) may be assigned to a multiplicity of IPs or EPs. An IP or EP may have multiple VLAN designation(n) s assigned to it.

Defined Flags

The following flags have been defined to allow several levels of complexity to be used in the operation of the VLAN invention. These defined flags provide for enhanced operation if the required functionality is present in the Hub to support said enhanced operation. These defined flags may also be used to turn off enhanced operation even though the functional capability is present in the Hub.

MACUse If true, the capability to store MAC addresses in MEM is present and MEM will return the associated IP(j) if MAC(m) is signaled; else MAC(m) cannot be used to limit Message traffic to the specific IP where the destination MAC is located.

MACEP If true, the capability to store MAC addresses and to also associate them with external ports is present. MACEP shall not be true unless the current value of MACUse is true.

NOTE: The above Defined Flags may be assigned on a per Hub basis. The description of operation would be equally valid if the Defined Flags were assigned on a per IP(j) or per EP(i) basis.

Initialization Procedures

The following initialization procedure is defined to load the contents of the memory so that the FPE can use it to provide the desired control over Hub operation. It is assumed that a subset of this initialization procedure may be performed if only a limited portion of the memory's contents are to be updated. These procedures may be done by a human operator, by local software, by a remotely located control program, or by any combination of all three.

```
BEGIN
    CLEAR MEM
    SET Defined Flags for desired mode of operation
                    consistent with Hub capability present
    For each IP(j) present on a Hub
        STORE all associated VLAN designation(n)s to MEM
        IF MACUse
            THEN STORE MAC(m) for each connected end
                                            station to MEM
            STORE MAC(m) of IP(j) to MEM
    For each EP(i) present on a Hub
        STORE all associated VLAN designation(n)s to MEM
END
NOTE: Multiple VLAN designation(n)s per IP(j) and per
EP(i) are allowed. Multiple end stations per IP(j) are
allowed and are the normal case. Only one MAC(m) per
IP(j) is the normal case.
MEM operation:
    The following MEM operation is defined:
BEGIN
    IF IP(j) SIGNALED to MEM by FPE
        THEN IF one or more associated VLAN
                                designation(n)s are found
            THEN SIGNAL all associated VLAN
                                designation(n)s to FPE
            ELSE SIGNAL "VLAN designation(n) not found"
                                                    to FPE
    IF MAC(m) SIGNALED to MEM by FPE
        THEN IF MACUse
            THEN IF an IP(j) is found for MAC(m)
                THEN SIGNAL IP(j) to FPE
                    SIGNAL all associated VLAN
                                designation(n)s to FPE
            ELSE IF MACEP FALSE
                THEN SIGNAL "MAC(m) not found" to FPE
                ELSE IF an EP(i) is found for MAC(m)
                    THEN SIGNAL EP(i) to FPE
                    ELSE SIGNAL "MAC(m) not found" to
                                                    FPE
            ELSE SIGNAL "Reject" to FPE
    IF VLAN designation(n) SIGNALED to MEM by FPE
        THEN if one or more associated IP(j)s are found
            THEN SIGNAL all associated IP(j)s to FPE
            ELSE SIGNAL "VLAN designation(n) not found"
                                                    to FPE
END
```

FPE Operation

The below pseudo code describes FPE operation upon receipt of a Message from any IP(j). One copy of the code is activated for each Message received by the FPE and thus there may be multiple copies of the code active at any instant in time. It is assumed that the FPE has the capacity to handle all Messages received from the IP(j)s, but should that not be the case then the FPE supplies the needed buffering at its input. On its output side, it is assumed that each EP(i) and IP(j) has adequate input buffers and that FPE queues Messages for the EP(i)s and IP(j)s in these buffers. Should the destination IP require a different message format than that of the source IP, then any translation required is part of the queuing process.

```
BEGIN
    Message received from any IP(j)
    IP(source) = IP(j) that sourced the Message
    MAC(dest) = destination MAC(m) from Message
    SIGNAL IP(source) to MEM
    VLAN designation(source)s = VLAN designation(n)s
                                            returned by MEM
    IF MACUse
        THEN SIGNAL MAC(dest) to MEM
            IF IP(j) is RETURNED
                THEN VLAN designation(ret)s = VLAN
                                designation(n)s are returned
                    IF IP(j) = IP(source)
                        THEN DISCARD Message
                            LOG discard of Message
                        ELSE IF VLAN designation(ret)s
                            MATCH VLAN designation(source)s
                                THEN QUEUE Message for IP(j)
                                ELSE DISCARD Message
                                    LOG discard of Message
                IF EP(i) is RETURNED
                    THEN Message = Message + VLAN
                                        designation(source)s
                        ENCAPSULATE Message for EP(i)s
                                                    returned
                        QUEUE Message for EP(i)s returned
                IF "Reject" or "MAC(m) not found" is
    RETURNED
                    THEN DISCARD Message
                        LOG discard of Message
                    ELSE SIGNAL VLAN designation(source)s to
    MEM
                        IF IP(j) = IP(source) is received
                            THEN IF no other IP(j)s are received
                                THEN DISCARD Message
                                    LOG discard of Message
                        IF IP(j)s not equal to IP(source) are received
                            THEN QUEUE Message for all such IP(j)s
                        IF any EP(i)s are received
                            THEN Message = Message + VLAN
                                            designation(source)s
                                ENCAPSULATE Message for EP(i)s returned
                                QUEUE Message for all EP(i)s returned
                        IF "VLAN designation(n) not found" RETURNED
                            THEN DISCARD Message
                                LOG discard of Message
            IF MACEP FALSE
                IF EP(i)s exist
                    THEN Message = Message + VLAN
                                        designation(source)s
                        ENCAPSULATE Message for EP(i)s
                        QUEUE Message for all EP(i)s
                    ELSE DISCARD Message
                        LOG discard of Message
END
```

The following FPE operation is defined upon receipt of a Message from any EP(i). One copy of the code is activated for each Message received by the FPE and thus there may be multiple copies of the code active at any instant in time. It is assumed that the FPE has the capacity to handle all Messages received from the EP(i)s, but should that not be the case then the FPE supplies the needed buffering at its input. On its output side, it is assumed that each EP(i) and IP(j) has adequate input buffers and that FPE queues Messages for the EP(i)s and IP(j)s in these buffers. Should the destination IP require a different message format than was received from the source EP, then any translation required is part of the queuing process.

```
BEGIN
    Message received from any EP(i)
    De-encapsulate Message
    MAC(dest) = destination MAC(m) from Message
    VLAN designation(source)s = VLAN designation(n)s
                                recovered from Message
    IF MACUse
       THEN SIGNAL MAC(dest) to MEM
          IF IP(j) RETURNED
             THEN VLAN designation(ret)s = VLAN
                                designation(n)s is returned
                IF VLAN designation(ret)s MATCH
                                VLAN designation(source)s
                   THEN QUEUE Message for IP(j)
                   ELSE DISCARD Message
                        LOG discard of Message
          IF EP(i) is RETURNED
             THEN Message = Message + VLAN
                                designation(source)s
                  ENCAPSULATE Message for EP(i)
                                returned
                  QUEUE Message for EP(i)
          IF "Reject" or "MAC(m) not found" is
RETURNED
             THEN DISCARD Message
                  LOG discard of Message
       ELSE SIGNAL VLAN designation(source)s to
MEM
          IF any IP(j)s are received
             THEN QUEUE Message for all such IP(j)s.
          IF any EP(i)s are received
             THEN Message = Message + VLAN
                                designation(source)s
                  ENCAPSULATE Message for EP(i)s returned
                  QUEUE Message for all EP(i)s returned
          IF "VLAN designation(n) not found" is
RETURNED
             THEN DISCARD Message
                  LOG discard of Message
END
```

What is claimed is:

1. A digital data communications network hub for controlling the transmission of messages to internal ports and to any end stations connected to said internal ports, said hub comprising:

n internal ports for receiving and transmitting messages within said hub, where n is an integer greater than zero;

memory means for storing virtual local area network, VLAN, designations for at least some of said internal ports, for storing media access control, MAC, addresses of said internal ports, and for storing MAC addresses of end stations including end stations connected to any of said internal ports;

means for assigning a VLAN designation to at least one of said internal ports and storing the assigned VLAN designation in said memory means;

means for determining the MAC address of each end station connected to any of said internal ports and storing the MAC addresses thus determined in said memory means;

means for associating the stored VLAN designation with messages transmitted from any of said internal ports to which said stored VLAN designation has been assigned;

means for identifying VLAN designations associated with and destination addresses carried by messages received within said hub; and means for transmitting to each of said internal ports only received messages which have an associated VLAN designation which matches the stored VLAN designation assigned to that particular port and carry a destination address which matches the stored MAC address of that port or the stored MAC address of one of the end stations connected to that same port.

2. The network hub of claim 1 comprising a plurality of internal ports and in which at least one of said internal ports is assigned a first VLAN designation and at least one of said internal ports is assigned a second VLAN designation.

3. The network hub of claim 2 in which at least one of said internal ports is assigned both said first VLAN designation and said second VLAN designation.

4. The network hub of claim 1 in which at least one of said internal ports is assigned at least a first VLAN designation for messages addressed to end stations to which it is connected and at least a second VLAN designation for messages addressed to it rather than to end stations to which it is connected.

5. A digital data communications network hub for controlling the transmission of messages to internal and external ports and to any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports and for storing media access control, MAC, addresses of said internal ports;

means for assigning a VLAN designation to at least one of said internal ports and storing the assigned VLAN designation in said memory means;

means for associating the stored VLAN designation with messages transmitted from any of said internal ports to which said stored VLAN designation has been assigned;

means for identifying VLAN designations associated with messages received by any of said ports; and means for transmitting to any of said internal ports only messages received within said hub which have an associated VLAN designation which matches the stored VLAN designation assigned to those particular ports.

6. The network hub of claim 5 comprising a plurality of internal ports and in which at least one of said internal ports is assigned a first VLAN designation and at least one of said internal ports is assigned a second VLAN designation.

7. The network hub of claim 6 in which at least one of said internal ports is assigned both said first VLAN designation and said second VLAN designation.

8. A digital data communications network hub for controlling the transmission of messages to internal and external ports and any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports and for storing media access control, MAC, addresses of each of said internal ports;

means for assigning a VLAN designation to at least one of said internal ports and storing the assigned VLAN designation in said memory means;

means for associating the stored VLAN designation with messages transmitted from any of said internal ports to which said stored VLAN designation has been assigned;

means for identifying VLAN designations associated with messages received by any of said ports;

means for transmitting to any of said internal ports only messages received within said hub which have an associated VLAN designation which matches the stored VLAN designation assigned to those particular ports;

means for storing in said memory means VLAN designations for at least some of said external ports; and means for transmitting outside of said hub from any of said external ports only messages having associated with them VLAN designations which match a VLAN designation stored in said memory means and associated with such external ports.

9. A digital data communications network hub for controlling the transmission of messages to internal and external ports and to any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports, for storing media access control, MAC, addresses of said internal ports, and for storing MAC addresses for end stations including end stations connected to any of said internal ports;

means for assigning a VLAN designation to at least one of said internal ports and storing the assigned VLAN designation in said memory means;

means for determining the MAC address of each end station connected to any of said internal ports and storing the MAC addresses thus determined in said memory means;

means for associating the stored VLAN designation with messages transmitted from any of said internal ports to which said stored VLAN designation has been assigned;

means for identifying VLAN designations associated with and destination addresses carried by messages received within said hub; and means for transmitting to any of said internal ports only received messages which have an associated VLAN designation which matches the stored VLAN designation assigned to that particular port and carry a destination address which matches the stored MAC address of that port or the stored MAC address of one of the end stations connected to the same port.

10. The network hub of claim 9 comprising a plurality of internal ports and in which at least one of said internal ports is assigned a first VLAN designation and at least one of said internal ports is assigned a second VLAN designation.

11. The network hub of claim 10 in which at least one of said internal ports is assigned both said first VLAN designation and said second VLAN designation.

12. The network hub of claim 9 in which at least one of said internal ports is assigned at least a first VLAN designation for messages addressed to end stations to which it is connected and at least a second VLAN designation for messages addressed to it rather than to end stations to which it is connected.

13. A digital data communications network hub for controlling the transmission of messages to internal and external ports and to any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports, for storing media access control, MAC, addresses of said internal ports, and for storing MAC addresses for end stations including end stations connected to any of said internal ports;

means for assigning a VLAN designation to at least one of said internal ports and storing the assigned VLAN designation in said memory means;

means for determining the MAC address of each end station connected to any of said internal ports and storing the MAC addresses thus determined in said memory means;

means for associating the stored VLAN designation with messages transmitted from any of said internal ports to which said stored VLAN designation has been assigned;

means for identifying VLAN designations associated with and destination addresses carried by messages received within said hub;

means for transmitting to any of said internal ports only received messages which have an associated VLAN designation which matches the stored VLAN designation assigned to that particular port and carry a destination address which matches the stored MAC address of that port or the stored MAC address of an end station connected to the same port; and means for transmitting outside said hub from said external ports messages which have associated with them said assigned VLAN designation and which originate from any of said internal ports only when such transmitted messages are addressed to neither an internal port within said hub nor an end station connected to an internal port within said hub.

14. The network hub of claim 13 comprising a plurality of internal ports and in which at least one of said internal ports is assigned a first VLAN designation and at least one of said internal ports is assigned a second VLAN designation.

15. The network hub of claim 14 in which at least one of said internal ports is assigned both said first VLAN designation and said second VLAN designation.

16. A digital data communications network hub for controlling the transmission of messages to internal and external ports and to any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports, for storing media access control, MAC, addresses of said internal ports, and for storing MAC addresses for end stations including end stations connected to any of said internal ports;

means for assigning a VLAN designation to at least one of said internal ports and storing the assigned VLAN designation in said memory means;

means for determining the MAC address of each end station connected to any of said internal ports and storing the MAC addresses thus determined in said memory means;

means for associating the stored VLAN designation with messages transmitted from any of said internal ports to which said stored VLAN designation has been assigned;

means for identifying VLAN designations associated with and destination addresses carried by messages received within said hub;

means for transmitting to any of said internal ports only received messages which have an associated VLAN designation which matches the stored VLAN designation assigned to that particular port and carry a destination address which matches the stored MAC address of that port or the stored MAC address of an end station connected to the same port;

means for storing in said memory means VLAN designations for at least some of said external ports; and means for transmitting outside of said hub from any of said external ports only messages having associated with them VLAN designations which match a VLAN designation stored in said memory means and associated with such external ports.

17. A digital data communications network hub for controlling the transmission of messages to internal and external ports and to any end stations connected to said internal and external ports, where only said external ports are connectible to hubs other than said hub, said hub comprising:

n internal ports for receiving and transmitting messages within said hub, where n is an integer greater than zero;

m external ports for receiving and transmitting messages external to said hub, where m is an integer greater than zero;

memory means for storing virtual local area network, VLAN, designations for at least some of said internal ports, for storing media access control, MAC, addresses of said internal ports, and for storing MAC addresses for end stations including end stations connected to any of said internal ports;

means for assigning a VLAN designation to at least one of said internal ports and storing the assigned VLAN designation in said memory means;

means for determining the MAC address of each end station connected to any of said internal ports and storing the MAC addresses thus determined in said memory means;

means for associating the stored VLAN designation with messages transmitted from any of said internal ports to which said stored VLAN designation has been assigned;

means for identifying VLAN designations associated with and destination addresses carried by messages received within said hub;

means for transmitting to any of said internal ports only received messages which have an associated VLAN designation which matches the stored VLAN designation assigned to that particular port and carry a destination address which matches the stored MAC address of that port or the stored MAC address of an end station connected to the same port;

means for storing in said memory means addresses for at least some of any end stations connected to said hub only through said external ports and VLAN designations for at least some of said external ports; and means for transmitting outside said hub from any of said external ports messages originating from any of said internal ports only to an end station whose MAC address is stored in said memory means or, if the addressed end station's MAC address is not stored in said memory means, then only through an external port having a VLAN designation matching the VLAN designation of the internal port at which the messages originate.

* * * * *